May 23, 1933.　　　　　G. D. RUETZ　　　　　1,909,986
DRINK MIXER
Filed July 30, 1932
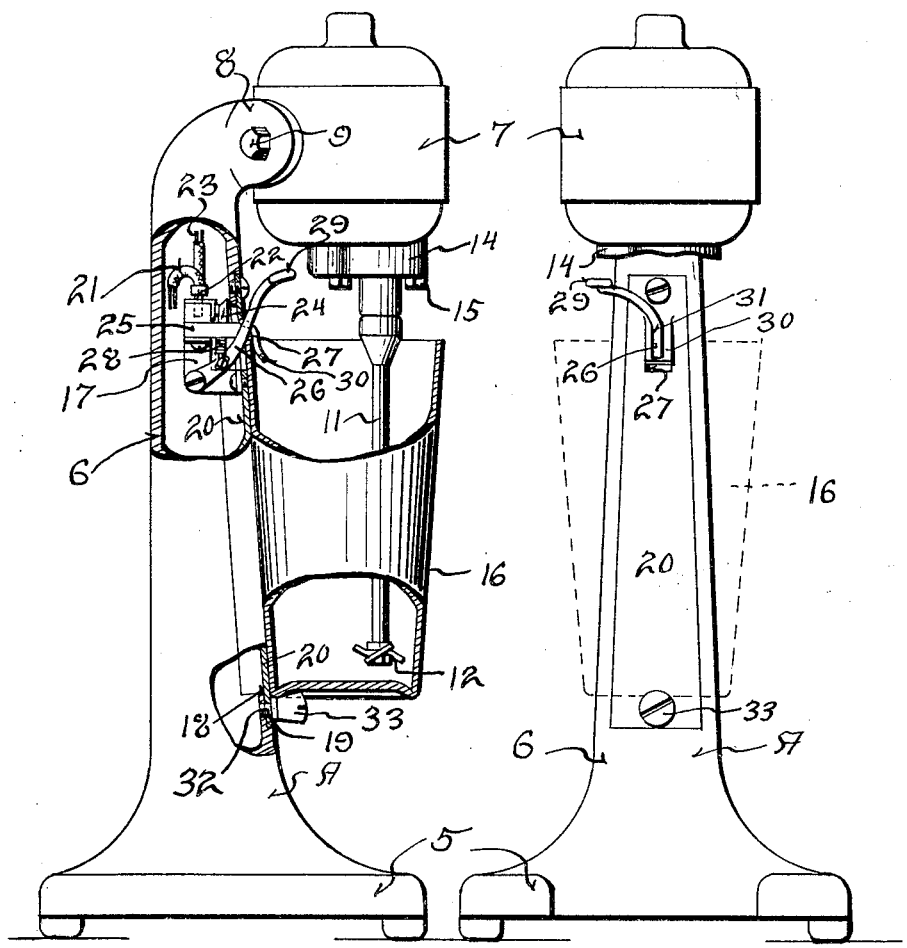
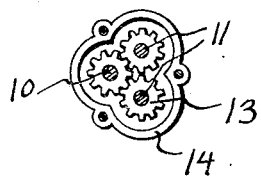
Inventor
G. D. Ruetz
By Young & Young
Attorneys Patented May 23, 1933

1,909,986

UNITED STATES PATENT OFFICE

GEORGE D. RUETZ, OF RACINE, WISCONSIN

DRINK MIXER

Application filed July 30, 1932. Serial No. 626,595.

This invention appertains to mixing devices and more particularly to drink-mixing devices especially susceptible for use in soda and the like fountains and of a character illustrated in my prior Patents 1,697,515 and 1,711,396, issued to me January 1, 1929, and April 30, 1929, respectively.

In drink mixers of the type referred to and embodying a base, a supporting column, a motor for actuating the agitators or stirrers, and a control switch for the motor, considerable difficulty has been experienced in associating the control switch with the column, whereby the device will be efficient in use, easy to assemble and the switch readily accessible for repairs and the like.

It is therefore one of the salient objects of my invention to provide novel means for forming the column and novel means for associating the control switch with the column, whereby the switch will be entirely housed and protected by the column and readily removable therefrom, so that replacements and repairs can be made thereto by the ordinary layman.

A further object of my invention is the provision of novel support for the shaker or receptacle receiving the drink to be mixed and novel means for associating the support with the column.

A further object of my invention is the provision of a drink mixing device embodying a supporting column for the motor having an elongated opening in the front face thereof with a supporting plate for the shaker or drink receptacle entirely enclosing the opening, the plate carrying the control switch for the motor so that when the plate is removed from the column, the switch will be removed therewith so that repairs and the like can be made thereto.

A further object of my invention is the provision of novel means for forming the plate itself and for associating the switch with the plate, whereby the plate will form an adequate support for the shaker or drink receptacle and whereby the actuating lever for the switch will be at all times in the path of the upper edge of the shaker or drink receptacle.

A further object of my invention is the provision of means for detachably securing the plate in position on the column, said means embodying a support for the lower end of the shaker or drink receptacle, when the same is placed in position on the plate.

A still further object of my invention is to provide an improved drink-mixing device of the above character, which will be durable and efficient in use, one that will be simple and easy to manufacture and one which can be placed upon the market at a reasonable cost.

With these and other objects in view, the invention consists in the novel construction, arrangement and formation of parts, as will be more specifically described, claimed and illustrated in the accompanying drawing, in which:

Figure 1 is a side elevation of my improved drink mixing device, showing parts thereof broken away and in section to illustrate structural details, the shaker or drink receptacle being shown in its operative position on the column of the device.

Figure 2 is a front elevation with parts thereof broken away, the operative position of the shaker being shown in dotted lines.

Figure 3 is a detail horizontal sectional view illustrating the means employed for actuating a plurality of agitating shafts.

Referring to the drawing in detail, wherein similar reference characters designate the corresponding parts throughout the several views, the letter A generally indicates my improved device which comprises a supporting base 5, which has molded or otherwise formed thereon the hollow supporting column 6. The base 5 and the column 6 can be formed of any preferred approved material such as porcelain or enamelled steel suitably treated to enhance the appearance thereof. The upper end of the column 6 supports the drive electric motor 7 which likewise can be of any desired make or type.

In the present instance I have shown the upper end of the column 6 provided with oppositely directed ears 8 against which the casing of the electric motor abuts and suitable fastening elements such as screws 9 can be inserted through the ears 8 into the casing of the motor. The armature shaft 10 of the motor is employed for driving a plurality of agitator shafts or spindles 11 and the lower ends of these shafts or spindles carry the agitating or stirrer heads 12.

In accordance with my structure, I provide the armature shaft 10 and the spindles 11 with intermeshing pinions 13 and these pinions can all be housed within a gear box or casing 14. This gear box or casing 14 can be connected with the lower end of the motor casing by the use of suitable screws 15 or the like.

As clearly shown in Figure 1 of the drawing, the agitating spindles or shafts 11 extend into the shake or drink receptacle 16 when the same is placed in its operative position on the column and the position of the shaker or drink receptacle 16 controls the operation of the control switch 17 for the motor.

As heretofore stated, the column 6 is of a hollow construction so as to receive the control switch 17 and in accordance with my invention, I provide an elongated opening 18 in the front face of the column through which the switch 17 is introduced into the column. The face of the column around the opening 18 can be rabbeted for receiving the marginal edge of the face plate 20, which closes the said opening. By providing the rabbet 19 the face plate 20 can be fitted flush with the outer face of the column and an accurate fit can be had by machining the rabbet for the reception of the face plate. This face plate 20 forms a support for the shaker or drink receptacle 16 as will be later pointed out.

In accordance with my invention, I secure the frame of the switch 17 directly to the inner face of the face plate 20, so that when the face plate is removed, the switch 17 will be removed therewith. This allows the repairs to the switch to be made in a convenient and expeditious manner. In order to further enhance repairs to the switch by the layman, the feed wires 21 leading the house circuit can be provided with plugs 22 for insertion in sockets in the switch. The wires 23 leading from the switch to the motor 7 can be connected with the switch in the same manner. While the switch can be of any preferred character, the same preferably includes a sliding bridge plate 24 for the space contacts of the switch and this bridge plate extends through a plate of insulation 25 which forms a guide for the same. Pivotally connected to the frame of the switch below the bridge plate 24 is the operating or control switch lever 26 and this switch lever extends through an opening 27 formed in the face plate 20. Thus, this switch lever extends beyond the outer face of the column, so as to permit the actuation thereof by the shaker or receptacle 16, as will be later set forth.

It is to be noted that the switch lever 26 is normally held in a lowered position for breaking the circuit of the switch by means of an expansion coil spring 28.

It is to be also noted that the switch lever 26 is provided with an extended finger grip portion 29 whereby the lever can be manipulated independently of the shaker or cup 16, so that it will be unnecessary to place a cup high on the spindles or shafts 11 when it is desired to use the mixer in connection with a small glass or the like.

Novel means is provided for holding the shaker or receptacle 16 on the face plate 20 and the upper end of the face plate has struck out therefrom a resilient tongue or hook 30 which is adapted to engage over the upper edge of the receptacle when the same is placed in its operative position in engagement with the switch lever. By referring to Figures 1 and 2 of the drawing, it will be noted that the resilient tongue 30 is provided with a slot 31 through which extends the switch lever 26 and thus, this tongue also forms a guide for the switch lever.

The lower end of the face plate 20 is held in place by means of a screw 32 having an enlarged head 33 and this enlarged head forms a seat for the lower end of the shaker or receptacle. Thus, the screw 32 is used for retaining the face plate in position and acting as a seat for the shaker.

In some instances it may be desirable to shorten the length of the face plate, in which instance a flat screw will be utilized for holding the face plate in position and a bracket or the like can be utilized for engaging under the shaker or receptacle.

In use of my improved drink mixing device, the shaker 16 is grasped in the hand of the operator and slid upwardly on the column with the mixing spindles therein until the upper edge of the shaker slides under the tongue 30 and raises the switch lever 26. At this time the lower end of the shaker can be moved over the head 33 of the screw 32. The upward movement of the switch lever actuates the switch and closes the circuit through the motor 7 automatically. As soon as the drink has become sufficiently mixed, the shaker is withdrawn from the column and the switch lever will be automatically moved to a lowered circuit breaking position by means of the expansion spring 28. The movement of the switch lever is upwardly and inwardly and insures the proper movement of the bridge plate 24.

From the foregoing description, it can be seen that I have provided an exceptionally simple and durable drink mixing device in which the receptacle or shaker is supported by a face plate, which in turn closes an opening in the supporting column, the opening being provided for the purpose of receiving the switch which is connected directly with the face plate.

While I have shown a drink mixer embodying a plurality of spindles, it is to be understood that only a single spindle can be utilized and this spindle can be connected with the armature shaft of the motor.

Changes in details may be made without departing from the spirit or the scope of this invention, but what I claim as new is:

1. A drink mixer comprising a base, a hollow supporting column on said base having an opening therein, a motor on said column, a receptacle supporting face plate for the column closing said opening, and a motor control switch secured to the inner face of the face plate and insertable in said column through said opening.

2. In a drink mixer, a hollow supporting column having an opening therein, a motor on said column, a receptacle supporting face plate for the column closing said opening, and a motor control switch secured to the inner face of the face plate and insertable in said column through said opening, said control switch including an operating lever extending beyond the face plate and in the path of the receptacle.

3. In a drink mixer, a hollow supporting column having an opening therein, a motor on said column, a receptacle supporting face plate for the column closing said opening, and a motor control switch secured to the inner face of the face plate and insertable in said column through said opening, said control switch including an operating lever extending beyond the face plate and in the path of the receptacle, and a finger knob on the end of the switch lever.

4. A drink mixer comprising a base, a hollow supporting column on said base having an opening therein, a motor on said column, a receptacle supporting face plate for closing said opening, a motor control switch secured to the inner face of the face plate and insertable in said column through said opening, said face plate having a struck-out tongue for receiving the upper edge of the receptacle, and means for supporting the lower end of the receptacle.

5. In a drink mixer, a hollow supporting column having an opening, a face plate for the column closing said opening against which the receptacle for the drink to be mixed bears, means detachably securing the face plate to the column, a motor on the upper end of the column, a control switch for the motor removably received within the column through said opening, means securing the switch to the inner face of the face plate, a struck-out tongue on the face plate for receiving the upper edge of the receptacle, said tongue having a slot therein, and a switch lever for the switch extending through the slot in the tongue and arranged in the path of the upper edge of the receptacle.

6. A drink mixer comprising a base, a hollow supporting column on said base having an opening therein, a motor on said column, a receptacle supporting face plate for the column closing said opening, a motor control switch secured to the inner face of the face plate and insertable in said column through said opening, a struck-out tongue on the face plate for receiving the upper edge of the receptacle, a control lever for the switch extending through the face plate and struck-out tongue and arranged in the path of the upper edge of the receptacle, and a screw for holding the face plate detachably in position on the column forming a support for the lower end of the receptacle.

7. In a drink mixer, a hollow supporting column having an opening therein, a motor on said column, a control switch for the motor removably received within the column through the opening, a face plate detachably connected with the column and closing said opening, and means on the face plate for supporting a receptacle.

8. In a drink mixer, a base, a hollow supporting column having an opening therein connected with said base, a motor on the upper end of said column, a control switch for the motor mounted within the column through the opening, a face plate detachably connected with the column and closing said opening, means on the face plate for supporting a receptacle, and means extending through said face plate for actuating said switch.

In testimony that I claim the foregoing I have hereunto set my hand at Milwaukee, in the county of Milwaukee and State of Wisconsin.

GEORGE D. RUETZ.